(12) United States Patent
Pelton et al.

(10) Patent No.: US 10,211,999 B2
(45) Date of Patent: Feb. 19, 2019

(54) INTEGRATED BUILDING MANAGEMENT SENSOR SYSTEM

(71) Applicants: Bruce A Pelton, Laguna Niguel, CA (US); Barton A Pasternak, Elkins Park, PA (US)

(72) Inventors: Bruce A Pelton, Laguna Niguel, CA (US); Barton A Pasternak, Elkins Park, PA (US)

(*) Notice: Subject to any disclaimer, the term of this patent is extended or adjusted under 35 U.S.C. 154(b) by 0 days.

(21) Appl. No.: 15/340,723

(22) Filed: Nov. 1, 2016

(65) Prior Publication Data

US 2018/0048485 A1 Feb. 15, 2018

Related U.S. Application Data

(60) Provisional application No. 62/411,562, filed on Oct. 22, 2016, provisional application No. 62/325,978, (Continued)

(51) Int. Cl.

| | | |
|---|---|---|
| H04L 12/28 | (2006.01) | |
| G05B 19/042 | (2006.01) | |
| G05B 15/02 | (2006.01) | |
| F24F 11/30 | (2018.01) | |
| F24F 11/62 | (2018.01) | |
| F24F 11/63 | (2018.01) | |
| F24F 11/59 | (2018.01) | |
| F24F 11/58 | (2018.01) | |
| F24F 110/00 | (2018.01) | |

(52) U.S. Cl.
CPC .......... *H04L 12/2829* (2013.01); *F24F 11/30* (2018.01); *F24F 11/62* (2018.01); *G05B 15/02* (2013.01); *G05B 19/0423* (2013.01); *G05B 19/0428* (2013.01); *H04L 12/282* (2013.01); *F24F 11/58* (2018.01); *F24F 11/59* (2018.01); *F24F 11/63* (2018.01); *F24F 2110/00* (2018.01); *G05B 2219/2614* (2013.01); *G05B 2219/2642* (2013.01)

(58) Field of Classification Search
CPC .............. H04L 12/2829; H04L 12/282; G05B 19/0423; G05B 19/0428
See application file for complete search history.

(56) References Cited

U.S. PATENT DOCUMENTS 9,035,917 B2   5/2015   Jansson
9,741,221 B1 * 8/2017   Rehfeld .......... G08B 13/19645
(Continued)

FOREIGN PATENT DOCUMENTS

CN   104661362 A    5/2015
DE   20309033 U1   12/2003

*Primary Examiner* — Vincent H Tran
(74) *Attorney, Agent, or Firm* — Joseph R DelMaster

(57) ABSTRACT

A building management system comprising an integrated sensor and control system integrated on a single application specific integrated circuit (ASIC). The ASIC combines sensor inputs necessary to monitor ambient light levels, light color, occupation/motion sensors, security sensors, temperature and humidity, barometric pressure, smoke and toxic substance sensors, and a processor to receive the sensor inputs and deliver control output signals to effect changes and make settings to each of the environmental systems that are monitored. The ASIC also provides human interface processing for operator control of each environmental system.

5 Claims, 11 Drawing Sheets

Related U.S. Application Data filed on Apr. 21, 2016, provisional application No. 62/292,970, filed on Feb. 9, 2016.

(56) References Cited

U.S. PATENT DOCUMENTS

| | | | |
|---|---|---|---|
| 9,920,944 B2* | 3/2018 | Chromy | F24F 11/70 |
| 2009/0303467 A1* | 12/2009 | Ashdown | G01J 3/36 |
| | | | 356/217 |
| 2010/0045971 A1* | 2/2010 | Brokopp | G01J 1/02 |
| | | | 356/51 |
| 2010/0302025 A1* | 12/2010 | Script | G01P 15/09 |
| | | | 340/539.1 |
| 2011/0251807 A1* | 10/2011 | Rada | G01D 4/00 |
| | | | 702/61 |
| 2012/0293334 A1* | 11/2012 | Yu | G08B 17/10 |
| | | | 340/632 |
| 2013/0106305 A1* | 5/2013 | Whitaker | G05F 3/02 |
| | | | 315/210 |
| 2013/0261809 A1* | 10/2013 | Morrow | G05D 23/1917 |
| | | | 700/278 |
| 2014/0339987 A1* | 11/2014 | Burrows | H05B 33/0896 |
| | | | 315/153 |
| 2014/0358294 A1* | 12/2014 | Nichols | G05D 23/1919 |
| | | | 700/278 |
| 2014/0375206 A1* | 12/2014 | Holland | H02J 9/061 |
| | | | 315/86 |
| 2015/0035440 A1* | 2/2015 | Spero | B60Q 1/04 |
| | | | 315/153 |
| 2015/0045962 A1* | 2/2015 | Wenzel | G05D 23/1923 |
| | | | 700/276 |
| 2016/0239723 A1* | 8/2016 | Ge | G08B 13/19615 |
| 2016/0360594 A1* | 12/2016 | Chemel | H05B 37/0227 |
| 2017/0132888 A1* | 5/2017 | Conlon | G08B 13/1672 |
| 2017/0192400 A1* | 7/2017 | Hofschulz | G05B 15/02 |
| 2017/0195130 A1* | 7/2017 | Landow | H04L 12/2816 |
| 2017/0295025 A1* | 10/2017 | Meriac | H04L 9/3265 |

* cited by examiner

INTEGRATED BUILDING MANAGEMENT SENSOR SYSTEM

This application claims priority from three provisional applications: 62/292,970 filed Feb. 9, 2016; 62/325,978 filed Apr. 21, 2016; and 62/411,562 filed Oct. 22, 2016.

FIELD OF THE INVENTION

The invention pertains to the field of lighting and environmental control in structures (commercial, residential, hospitality, healthcare, industrial and agricultural facilities) and/or public facilities (stadiums, playing fields, parking lots, parking structures), and in particular to the integration of multiple sensors of light, daylight, temperature, pressure and humidity, occupancy, smoke/toxic substances, and other parameters into a processing unit, and controller fabricated on a single integrated circuit device capable of communicating with various networks, the cloud or the Internet of Things.

BACKGROUND OF THE INVENTION

There are many variations of building security systems, home and office lighting systems, and various forms of environmental control systems for structures. Some of these technologies are hard-wired; some can be operated wirelessly. Some can be controlled from remote locations by commands received over networks both wireless and otherwise. Each of these control systems is either intended to be discrete as to application (e.g., lighting, security, HVAC, etc.) or may combine more than one application in a single system. However, in order to have full control capability, a user must commonly invest in more than one physical system and often more than one service provider. The present invention addresses that problem by providing a single technical solution.

When a network of sensors is dispersed throughout a building or facility, energy consuming system optimization is possible. These devices can also provide valuable intelligence about the facility's utilization, traffic flow, security and asset tracking. By providing the ability to provide this networking either through wired, optical, or wireless means an integrated system allows the designer the opportunity to make the optimal choice for a given system or facility.

SUMMARY OF THE INVENTION

The invention is an integrated building management system featuring an integrated building management system controller contained in a single ASIC. The system comprises a controller and sensor system for operation of networked lighting control, heating ventilation and air conditioning (HVAC), security monitoring, smoke and toxic gas detection, automated alerts, and command communication for all building management functions and includes a miniature multi-function sensor device that provides several sensor signals to the controller from one or more lighting fixtures. The system operates with a single application specific integrated circuit (ASIC) at its core that provides full environmental sensor capability along with a central processor that handles all of the sensor inputs, control output signals, and human interface within a secured operating environment.

The system is capable of detecting, measuring and responding in a predetermined way to occupancy, light levels, color temperature of that light, ambient temperature, driver temperature, LED array temperature, humidity, air pressure, power consumption, power rates, sonic events, various gasses and potential hazards, RFID, etc. It can communicate with other sensors, the internal network, building systems and internet based systems via wired, wireless, powerline and other technologies. Careful control of environmental systems is required not only by Department of Energy (DOE) regulations and building codes but also by prudent financial management. By determining the availability of shared spaces like conference rooms, hotel office spaces and common areas the system makes the buildings it controls more habitable.

The ASIC also carries power regulation and communication interfaces on its package. This power management component allows the chip and its sensors to operate from multiple power sources and to provide outputs that can manage many types of loads from LED drivers to VAV dampers. Its ability to measure power provides valuable additional data. Powerline communication interface enables data communications over common power line connections to and from devices similarly equipped.

The ASIC flexible interface allows users to connect with many different transceivers and communicate with their preferred protocol whether it is Infrared, RF, wired, powerline, POE, internet or cloud. Connection to one of the variously available transceivers mounted with the ASIC makes wireless communication possible with remote locations through an associated antenna (See FIG. 1, 122). Such a system offers new levels of compactness and a more complete range of sensing modalities than other current systems. This flexible interface allows the system to respond to utility generated signals, including wireless signals, and those from building management systems, RFID and detectors of gasses and other environmental factors. The ASIC device can interoperate with Zigbee, Z-Wave, WiFi, 4G LTE, Bluetooth, LTE Cat 0, and other radio protocols as well as wired protocols including powerline carrier transceivers, UARTs, POE and TCP/IP interfaces. Communication through wireless carrier or wired digital signals is therefore supported by the ASIC communication interface.

Another aspect of the invention is a miniature multi-function sensor for installation in light fixtures. A purpose-built integrated circuit has been developed that contains and shrinks the electronics required to sense temperature, humidity, occupation and motion all from within a light fixture. A single compact circuit board contains the integrated circuit, a crystal, transceiver, memory, driver output controls and necessary discrete components. The tiny circuit board is connected by two ribbon cables, one six-conductor and one three-conductor. A three-position bulkhead connector connects to a driver. The device draws power from the driver, power-over-ethernet (POE) or the supply. The integrated circuit of the miniature multi-function sensor manages the different power requirements of the various sensors, the processor, and the transceivers/comms devices.

BRIEF DESCRIPTION OF THE DRAWINGS

For purposes of illustrating the invention, the drawings show one or more forms in which the invention can be embodied. The invention is not, however, limited to the precise forms shown unless such limitation is expressly made in a claim.

FIG. 3A is a circuit block diagram of the A/D converter referenced at the output of the Instrumentation Amp 224. FIG. 3B is a circuit block diagram of the Ibias generator input to the Instrumentation Amp 224. FIG. 3C is a circuit block diagram of a reference voltage (Vref) generator for the 10 bit DAC 228.

FIG. 5A depicts a passive infrared (PIR) motion sensor. FIG. 5B illustrates an infrared data receiver. FIG. 5C shows a circuit diagram of an ambient light sensor.

DETAILED DESCRIPTION

An integrated building management control and sensor system comprising all necessary computer processing for environmental sensing and control and including sensor input and control signal output functions combined on a single application specific integrated circuit (ASIC) device. The single ASIC invention provides monitoring and control of environmental systems whether it is stand-alone, networked or part of the Internet of Things (IoT). Among the things to which it can respond and exercise control are occupancy, daylight, room CCT, time, room temperature, LED array temperature, utility signals for demand response, and building management commands. The processor and data storage allow the system to continue to operate without disruption even during periods of communication or network failure.

The outputs of the ASIC can be configured to operate a wide range of LED drivers including 1-10V and 0-10V, digital addressable lighting interface (DALI), DALI+, pulse width modulation (PWM), and direct digital control (DDC). Among the sensors which can be powered by and interfaced with the ASIC are passive infrared (PIR) and digital PIR, photodetector, CMOS sensor, and smoke, fire, CO, CO2, CFC, barometric and security monitors. The smoke, carbon monoxide (CO), carbon dioxide (CO2) and chlorofluorocarbon (CFC) sensors provide accurate air quality measurement and—if necessary—can trigger alerts. An onboard programmable microprocessor, comparators and shared 10-bit ADC allows for programmable and customizable lighting scenes (that is, settings for one or more light arrays) to be loaded into an on board FLASH memory.

Figure 1:
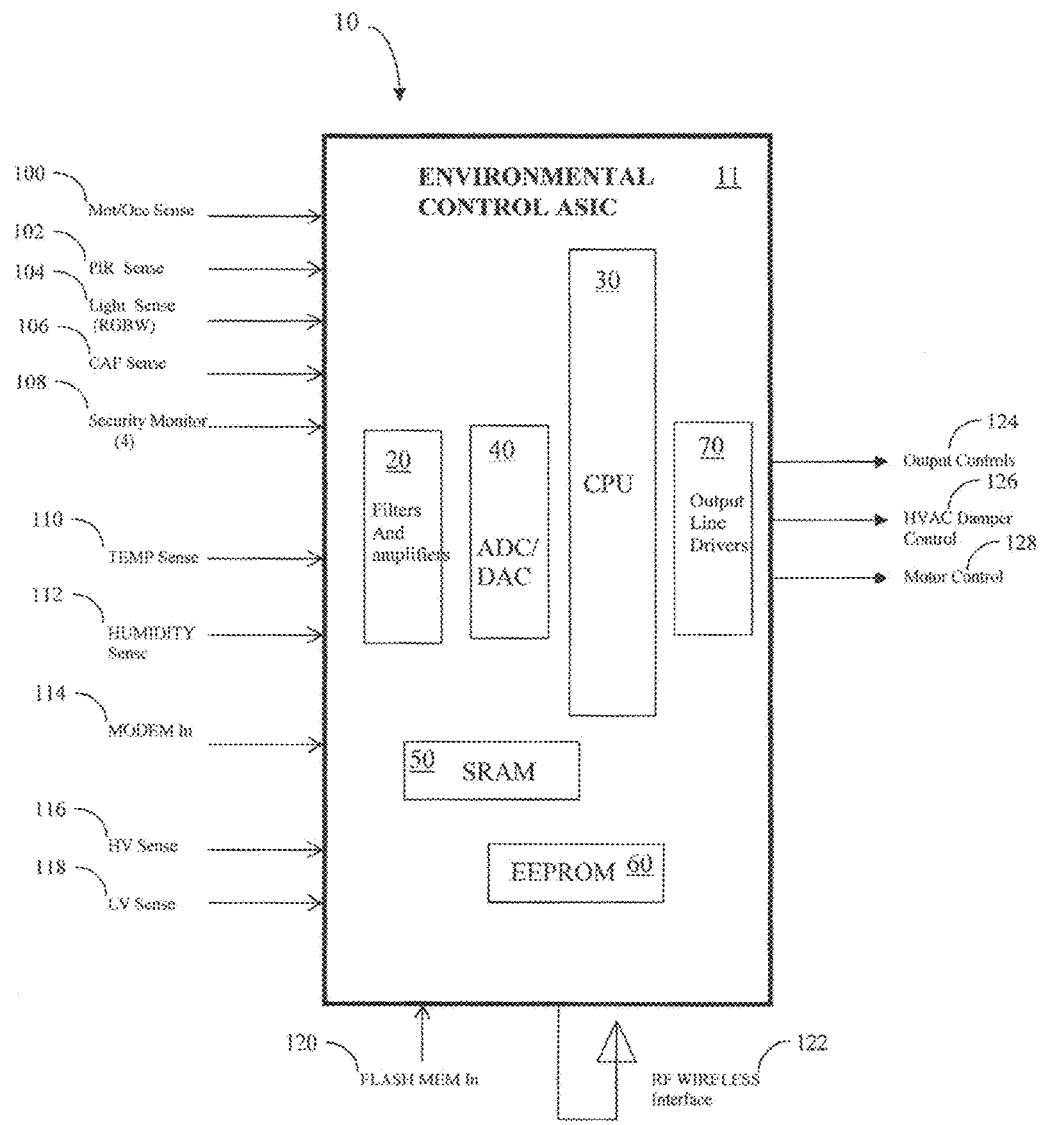
FIG. 1 is a functional block diagram of the integrated building management control and sensor system ASIC.

Referring to FIG. 1, the system 10 comprises a single ASIC 11 that integrates several fundamental functions on a single circuit device. The ASIC device 11 comprises a collection of filters and amplifiers 20 that condition the several input signals (100-120) for further processing. A group of analog-to-digital converters (ADC) and digital-to-analog converters (DAC) 40 translates sensor input signals to digital form for processing and converts digital outputs to analog where necessary for control of external devices. A computer processing unit (CPU) 30 performs all signal processing, system control decision functions, and output signal generation for the system. The ASIC also contains non-volatile areas to store unique device identification, private key and other security functions.

Supporting the processor 30 are a static read-only memory (SRAM) 50 and an electrically erasable programmable read-only memory (EEPROM) 60. The SRAM 50 provides data storage capacity for the processor 30 while the EEPROM 60 enables updates to the operating program and/or subroutines that operate the processor 30. The ASIC 11 also comprises a set of output line drivers for control signals generated by the processor 30 that are intended for operation of external systems such as lighting and HVAC systems.

The ASIC flexible interface allows users to connect with many different transceivers and communicate with their preferred protocol whether it is Infrared, RF, wired, powerline, POE, internet or cloud. Connection to one of the variously available transceivers mounted with the ASIC makes wireless communication possible with remote locations through an associated antenna (See FIG. 1, 122). Such a system offers new levels of compactness and a more complete range of sensing modalities than other current systems. This flexible interface allows the system to respond to utility generated signals, including wireless signals, and those from building management systems, RFID and detectors of gasses and other environmental factors. The ASIC device can interoperate with Zigbee, Z-Wave, WiFi, 4G LTE, Bluetooth, LTE Cat 0, and other radio protocols as well as wired protocols including powerline carrier transceivers, UARTs, POE and TCP/IP interfaces. Communication through wireless carrier or wired digital signals is therefore supported by the ASIC communication interface.

In order that the system be capable of processing and controlling several environmental functions, the ASIC 11 has a number of sensor inputs for the processor to be aware of the various conditions (e.g., lighting, temperature and humidity, air pressure, security monitors) existing in its facility (or facilities). FIG. 1 illustrates several such sensor inputs. A motion/occupancy sensor generates a signal 100 indicating the presence of a person or persons in a monitored space. A passive infrared sensor (PIR) 102 input receives a signal indicating detection of one or more heat sources in a monitored space. A PIR or a thermopile is used to determine occupancy. They do so by monitoring heat sources. They may have multiple pixels allowing the counting of people.

The system may include another infrared data sensor (not shown) for reception of remote control signals or commissioning commands from a remote device. Light sensors provide one or more inputs 104 (e.g., red, green, blue, white light levels) for colorimetry calculations and determination of light conditions (that is, light temperature in degrees Kelvin) in monitored areas for control by the processor 30.

A capacitance sensor 106 is provided for alternate measurement of humidity. A number of sensor inputs are provided for security monitor 108 inputs, receiving signals from window and door sensors, for example. Sensor inputs for temperature 110 and humidity 112 condition monitors in one or more locations allow control of environmental conditions in monitored spaces. For example, the processor determines the optimal start time for HVAC systems based on sensed parameters comprising exterior ambient temperature, humidity, interior temperatures, interior humidity. Temperature sensing also enables the processor to make corrections for sensor variations caused by temperature changes.

The combination of temperature and light sensor signals enables the processor to make control determinations for related systems. In spaces equipped with electrically operated window shades (or LCD darkening technology) for example, the processor determines the optimal mix of daylight and electric space lighting and operates window shading accordingly if heat gain offsets lighting reduction gains in a monitored space.

A MODEM input 114 facilitates data input over communication lines. Input voltage level sensors monitor for high 116 and low 118 voltage conditions on the power supply line. A FLASH memory input 120 provides an interface through which to load desired control parameters into the ASIC processor 30 and/or load new program updates into the EEPROM 60. An RF wireless interface 122 and antenna enables wireless control input and output signaling to and from the device 10. Computed building status based on the full scope of sensor data is communicated to building systems with the RF transceiver and interface.

The result of processing one or more sensor inputs is the creation and output of signals for control of the associated environmental system. For instance, sensing the temperature and humidity of a space provides the data necessary to compare the sensed value to a programmed value in the processor. If that comparison indicates that an adjustment of one or both measured parameters is necessary, then appropriate output signals are generated by the processor 30. These signals are conditioned by the output line drivers 70 to operate the physical system, in this case the HVAC. Driver lines are provided to the HVAC damper 126, the air circulating motor 128, and other outputs 124 necessary to control the heating and/or air conditioning units. The ASIC processor manages variable air volume in an HVAC system to adjust environmental characteristics in a monitored and controlled space. In a similar manner, output signals (not shown) are generated for the security system and lighting controls based on inputs from the motion/occupation sensors 100, security monitor 108, and light level sensors 104.

Figure 2:
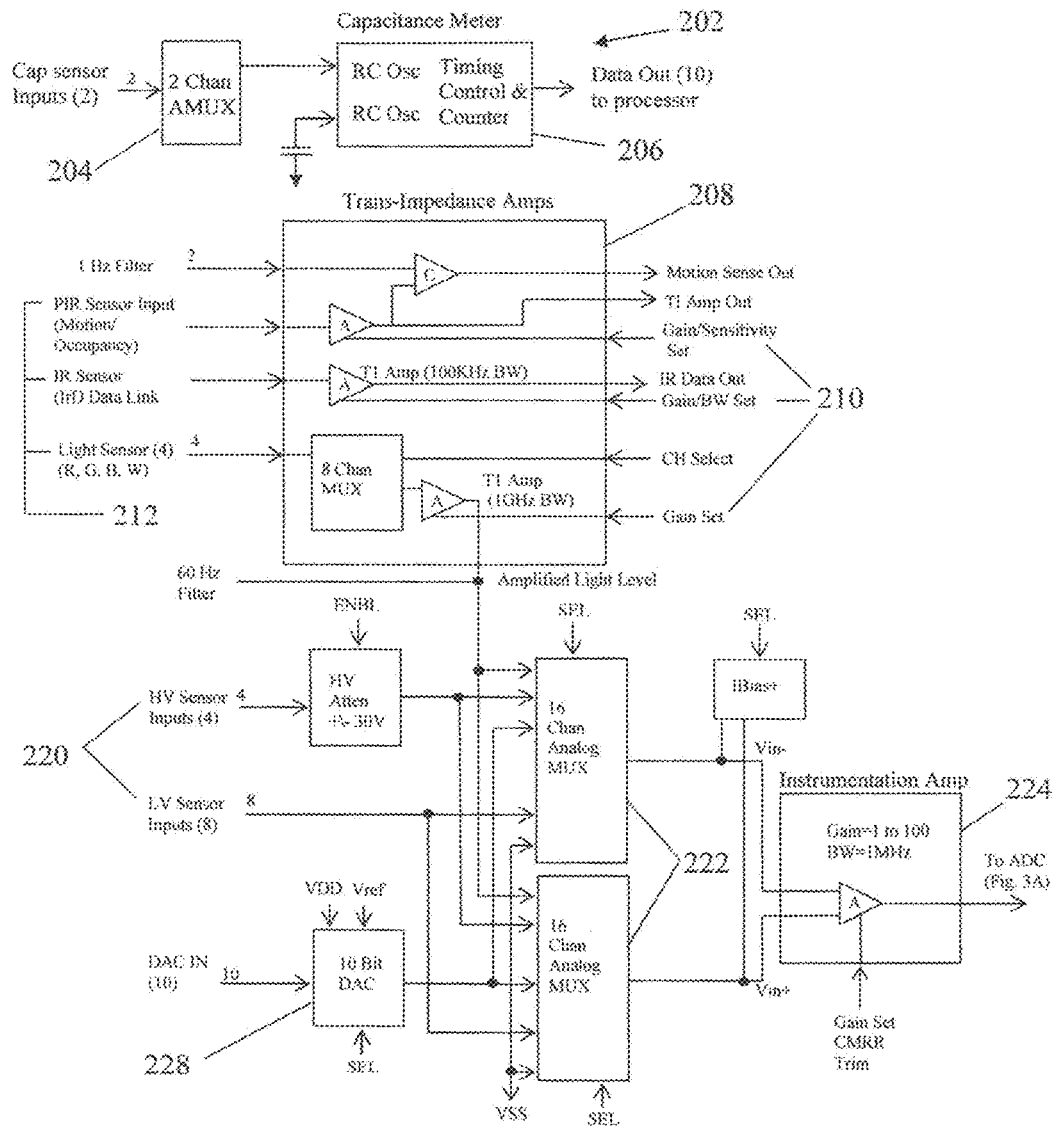
FIG. 2 is a partial circuit block diagram of the invention.

Referring to FIG. 2, there are provided illustrations of the sensor circuits in block diagram form from which persons skilled in the art may construct the actual electronic circuits. The temperature and humidity sensors are capacitance devices that create the two inputs to the capacitance meter 202 through a two-channel analog multiplexer (AMUX) 204. The varying capacitances become inputs to an RC oscillator capacitance meter 206, the output of which is counted and becomes 10-line data output to the microprocessor. This feature enables the onboard processor to perform integrated temperature and humidity detection, measurement and determination.

Another input stage illustrated in FIG. 2 is that which processes the motion/occupancy, infrared data signal, and light level sensors 212 through trans-impedance amplifiers 208 for producing stable outputs to the processor. An infrared data signal receiver receives infrared data communications for programming, inter-sensor data sharing and commissioning. Each of the trans-impedance amplifiers has the sensor signal as input and produces an output based on that input and a gain (or gain/bandwidth) setting 210 received from the processor.

An RFID bridge may be connected to the I/O of the chip and powered by the power management section of the chip. The RFID bridge can energize and read data from RFID tags and people, equipment, drugs and merchandize.

The system is also capable of reading low power beacons attached to portable equipment in facilities such as hospitals and schools.

Figure 3A:
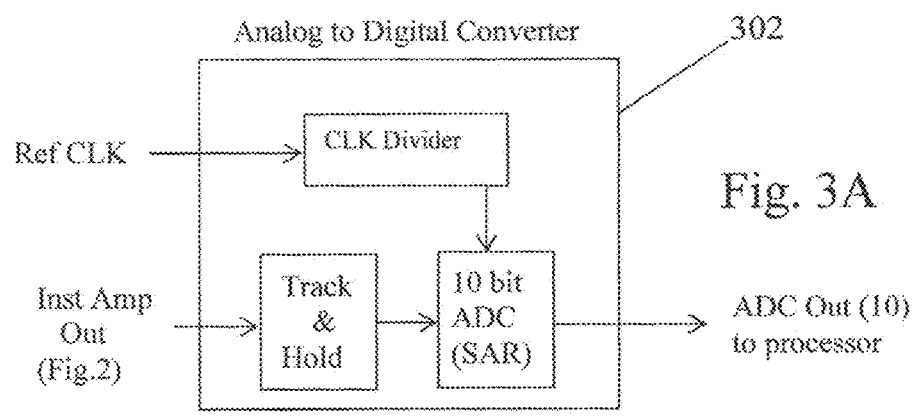
FIGS. 3A, 3B, and 3C are partial circuit block diagrams of parts of the invention continued from FIG. 2.

There is a sensor circuit for sampling both high and low voltage supply levels 220 by the ASIC device. These supply voltages are directed through analog multiplexers 222, filtered by an instrumentation amplifier 224 and sent on to an analog-to-digital converter 302 (see FIG. 3A) for sampling and input to the processor. Sensing current, voltage and phase angle of a power supply (such as a lighting system or an HVAC system) enables the processor on the ASIC to determine the power consumption of the monitored system and make necessary adjustments for economy.

Figure 3B:
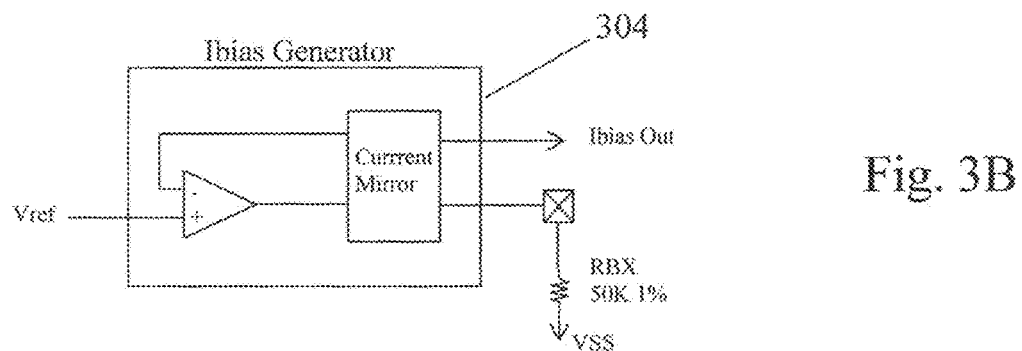
Figure 3C:
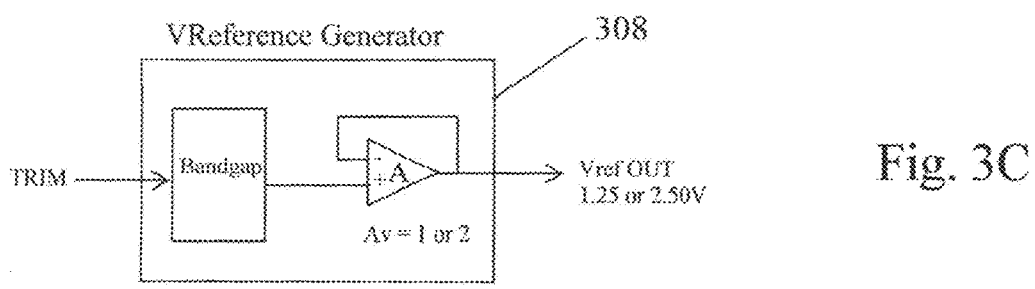

Referring to FIG. 3B, also illustrated is the Ibias generator that creates the Ibias level that is input to the instrumentation amplifier 224 in the voltage level sensor circuit of FIG. 2. A voltage reference generator 308 is illustrated in FIG. 3C that produces the reference voltage that is supplied to the 10-bit DAC 228 in FIG. 2.

Figure 4:
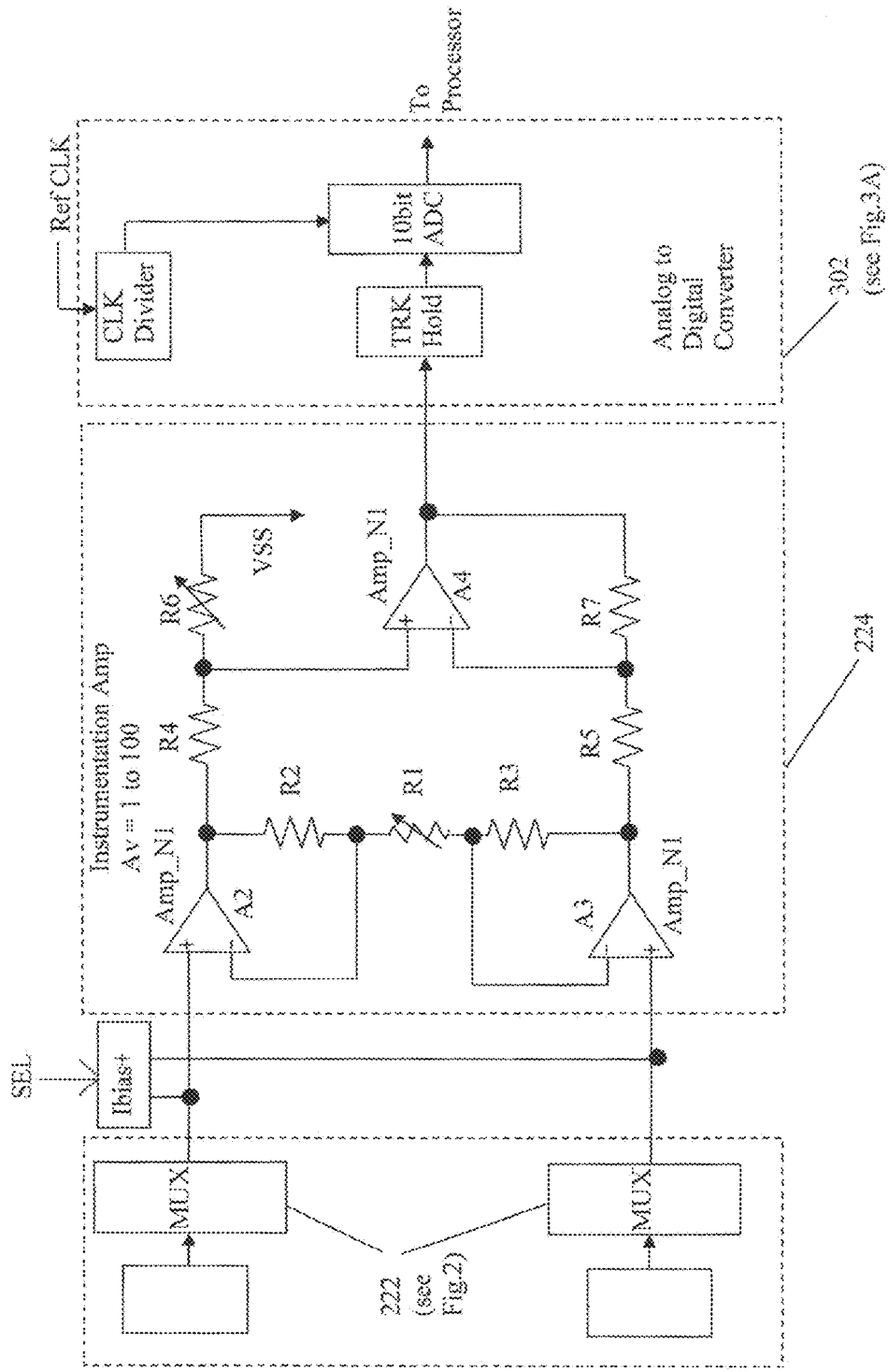
FIG. 4 is a partial circuit block diagram showing the light level detection part of the invention illustrated in FIG. 2 with an embedded circuit diagram of the Instrumentation Amplifier shown in FIG. 2.

Reference to FIG. 4 shows a more detailed circuit diagram of the Instrumentation Amplifier 224 shown in FIG. 2 in the voltage sensor stage of the ASIC. The gain of the amplifier is adjustable from 1 to about 100 by varying R1 as necessary to adjust the sensitivity of the circuit and for accuracy of measurement of the high and low voltages.

Figure 5A:
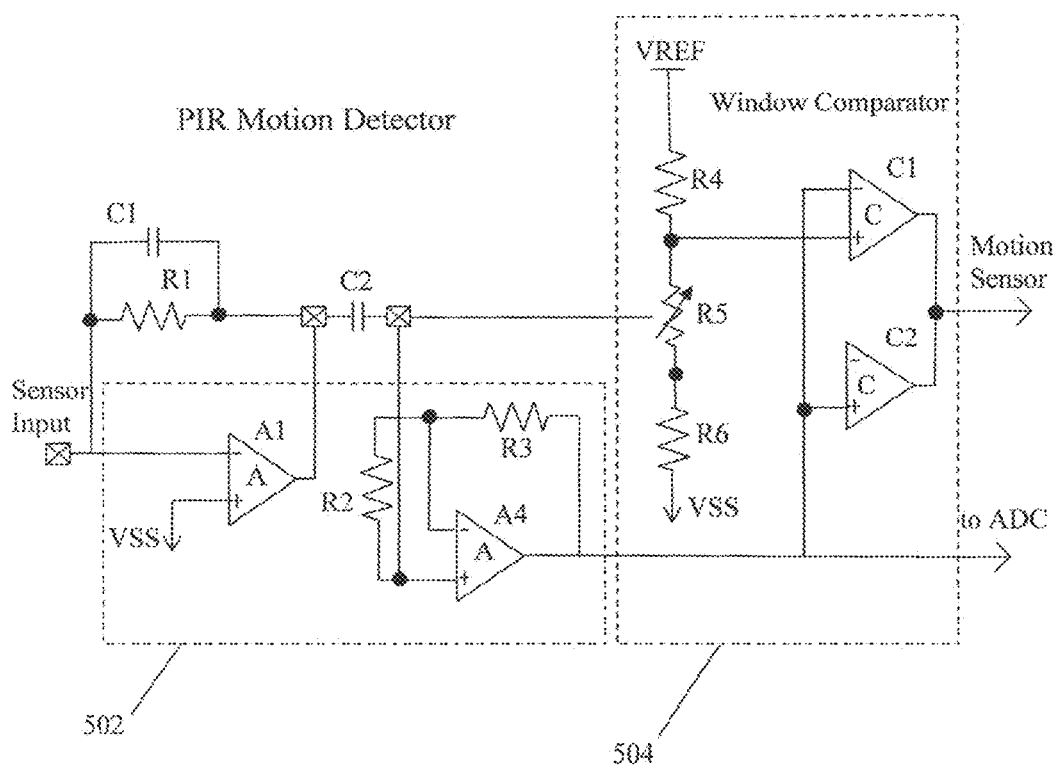
FIGS. 5A, 5B and 5C are circuit diagrams of three detection circuits forming three of the inputs to the processing function of the invention.
Figure 5B:
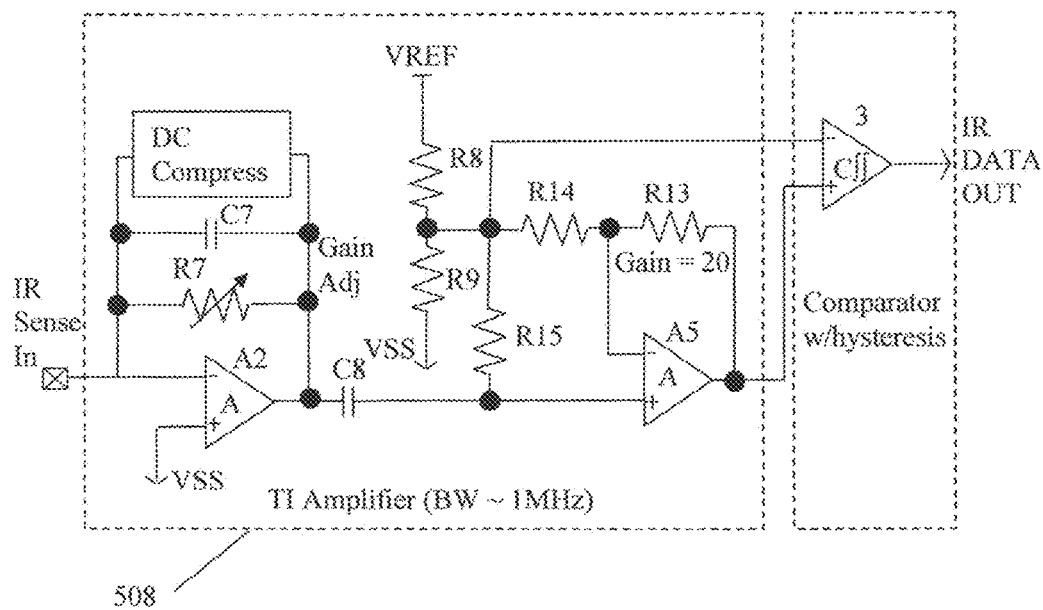
Figure 5C:
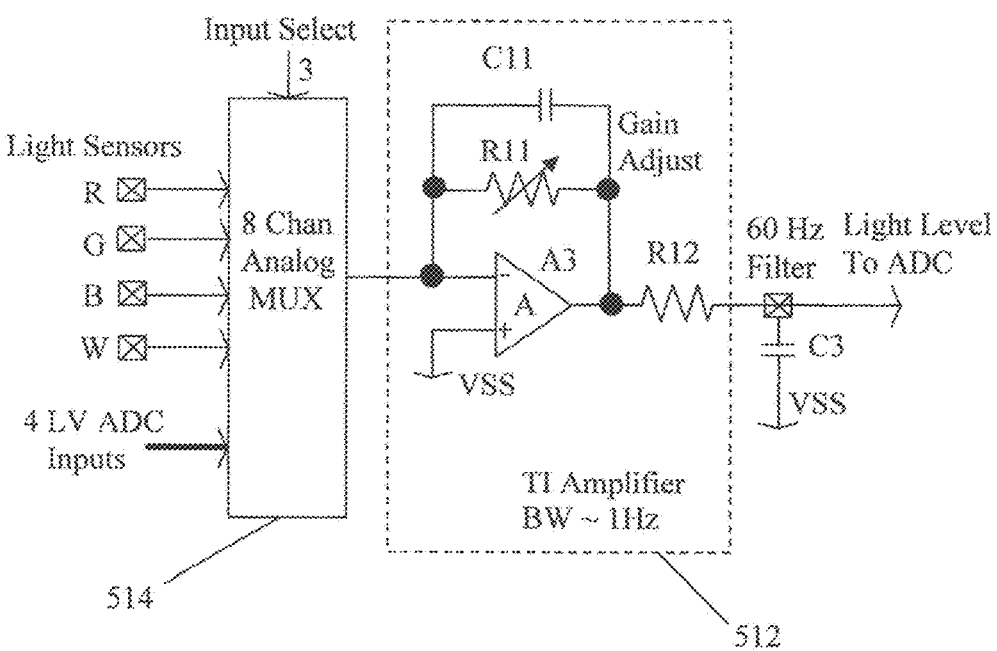

FIG. 2 illustrated that the motion sensors, infrared data link sensor, and the light level sensors passed their inputs through trans-impedance (TI) amplifiers 208 for conditioning before processing. Reference to FIGS. 5A, 5B ad 5C shows the configuration of each of these TI amplifiers. Each configuration is different per the function of the sensor. The passive infrared motion sensor and occupancy indicator circuit is conditioned by a two-stage amplifier 502 shown in FIG. 5A that smoothes the input for the window comparator 504 and amplifies it for quantification by an analog-to-digital conversion. The infrared data receiver shown in FIG. 5B employs a TI amplifier 508 with a band-limiting filter stage and a gain stage for processing data pulses in an optical infrared signal. The ambient light sensor shown in FIG. 5C places a TI low-pass filter amplifier 512 at the output of the multiplexer 514 that handles the four light color inputs from the sensor. This amplifier 512 has a very low bandwidth to smooth the selected color sensor output to the ADC.

The processor on the device uses motion and occupancy sensor information to provide unique security functions in the system. Based upon occupancy and motion sensor detections signals, the processor determines intruder location, movement, and path projection, including likely egress determination, to assist security personnel in making apprehension of said intruder. An included security function determines a count of likely intruders based on occupancy sensor detection patterns. The ASIC security capability is augmented by audio detection circuits for occupancy detection and, importantly, for event detection even in the absence of human presence.

It is important to provide for the security of the system in order that outside actors are not able to gain unauthorized access. Any system using wireless communication is vulnerable to intrusion. Therefore the system is configured for encrypted communication using public and/or private key modalities familiar to those skilled in the art of data encryption and protection. Another implementation for system security may be a blockchain database storing private encryption key data for access only by authorized parties.

By resetting the blockchain at random intervals it can be shortened significantly. A CRC can be generated of the past transactions and stored within the blockchain effectively creating a past and present private key. This may be coupled with a MAC address header for each packet that is transmitted with each transaction. After being checked against a library of accepted MAC addresses the verified packet would be accepted and acted upon. The blockchain is reset at random, irregular intervals. It includes CRC of past transactions. This make it a living, constantly changing key with authentication. Any foreign device entering the network will not have the current key. Its transmissions will not be accepted. A record is kept of all transactions and transmitted to all units in network as part of each command. The register is reseeded at random intervals to keep packet size down. Any unit removed from the system and later attempting to reenter without being formally commissioned would not have the appropriate key and would not be in the MAC address database. Commissioning would include seeding the blockchain storage and registering the MAC address into the accepted device database.

Figure 6:
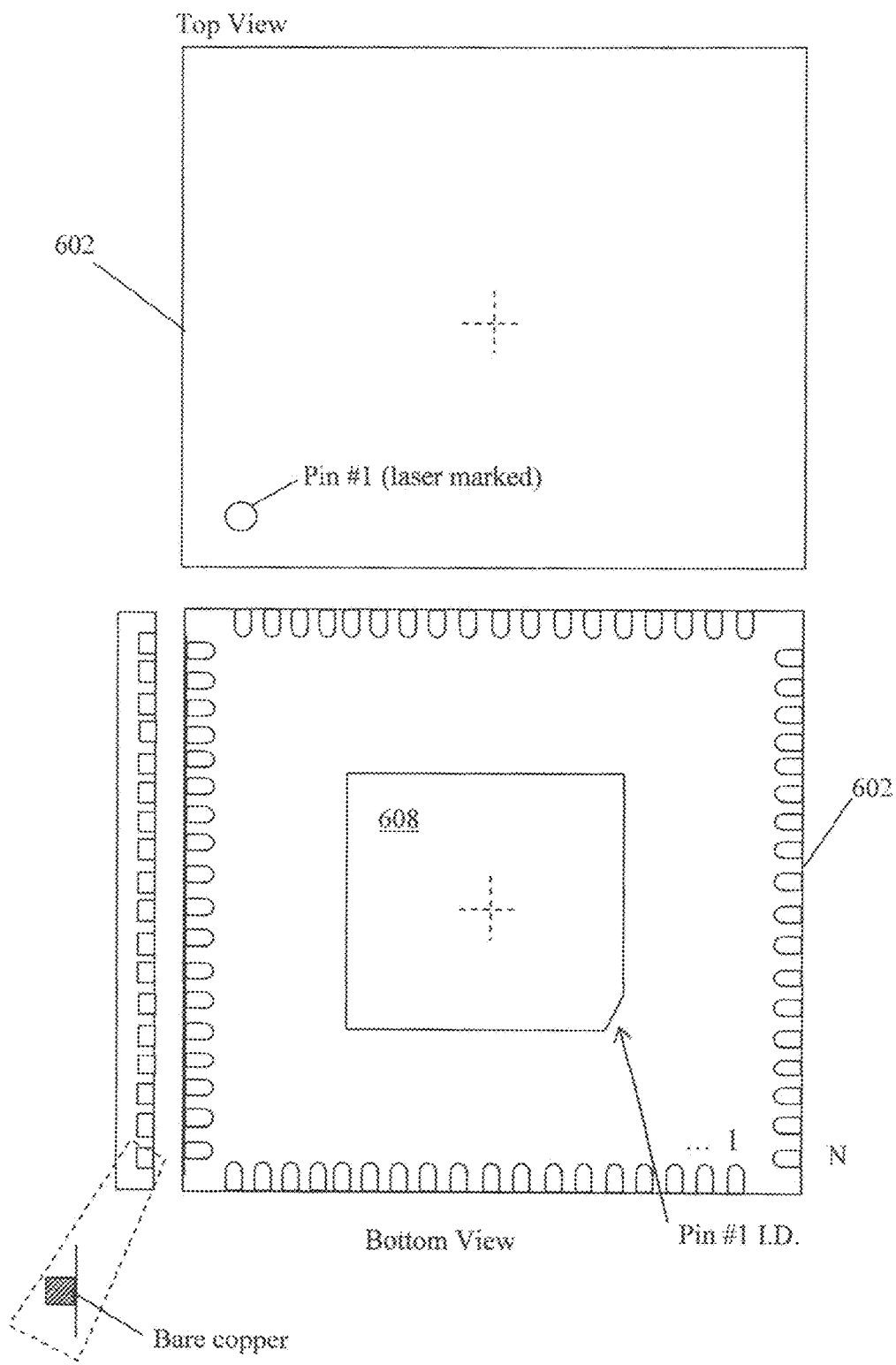
FIG. 6 is a top and bottom plan diagram of the integrated circuit device of the invention.

Referring to FIG. 6 there is shown a plan diagram (top and bottom) of the integrated circuit ASIC of the present invention. It comprises a 72-pin substrate 602 carrying the ASIC wafer 608 on which all of the circuits reside. Each of the 18 pins on each side of the substrate is a solid copper deposit connected to the corresponding electrode on the wafer by a filament wire in the substrate. Fabrication is by conventional means known to those skilled in the art of integrated circuit manufacture.

Table 1A is a list of the electrical characteristics of the ASIC of the present invention. It details the electrical norms for the reference voltage generators and regulator circuits of the device along with the various photo sensor elements.

TABLE 1A

TABLE 1A Electrical Characteristics
$V_{DD}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| Reference Generators & Regulators | | | | | | |
| Bandgap Voltage Reference Output Voltage | $V_{REF}$ | $R_L$ >10 KΩ $C_L$ <100 pF | | 2.2 | | V |
| Bandgap Voltage Reference Trim Range | $VREF_{TR}$ | Resolution Setting = Minimum Setting = Maximum | | 23 −7.3 +6.6 | | mV % % |
| Bias Current Reference $R_{BIAS}$ Current | $I_{BIAS}$ | $R_{BIASX}$ = 121 KΩ, 1% $C_{BIAS}$<20 pF (PCB stray C) $V_{REF}$ = 2.50 V | | 10 | | uA |
| LDO Voltage Regulator Output Voltage | $VREG_{LDO}$ | $V_{REF}$ = 2.50 V, $C_{LX}$ ≥1 uF SEL1, SEL0 = 00 SEL1, SEL0 = 01 SEL1, SEL0 = 10 SEL1, SEL0 = 11 | | 1.80 2.50 3.00 3.60 | | V V V V |
| LDO Voltage Regulator Maximum Output Current | $IREG_{LDO}$ | $V_{POS}$ = 5.0 V | | 100 | | mA |
| Boost Voltage Regulator Output Voltage | $VREG_{BOOST}$ | $V_{POS}$ = 5.0 V, $V_{REF}$ = 2.50 V 3 Stage, $C_{BSTX}$ = 1 uF | | 15.0 | | V |
| Boost Voltage Regulator Maximum Output Current | $IREG_{BOOST}$ | $V_{POS}$ = 5.0 V 3 Stage, $C_{BSTX}$ = 1 uF | | 100 | | mA |
| Buck Voltage Regulator Output Voltage | $VREG_{BUCK}$ | $V_{POS}$ = 15.0 V $V_{REF}$ = 2.50 V | | 5.0 | | V |
| Photo Sensors (PIR Motion Detector, Ambient Light Level/Color, IR Data) | | | | | | |
| PIR Motion Sensor Gain | $PIR_{MSG}$ | $R_{FX}$ = 20 KΩ (external) $R_{FX}$ = 100 KΩ (external) $R_{FX}$ = 500 KΩ (external) | | 400 2,000 10,000 | | mV/uA mV/uA mV/uA |
| PIR Motion Sensor Bandwidth | | ($R_{FX}$, $C_{FX}$ are external) | | | | |
| Low pass $F_C$ (−3 dB) | $PIR_{BWL}$ | $R_{FX}$ = 100 KΩ, $C_{FX}$ = 1 uF | | 0.5 | | Hz |
| High pass $F_C$ (−3 dB) | $PIR_{BWH}$ | $C_{CX}$ = 1 uF | | 5 | | Hz |
| PIR Motion Detector Trip Levels | $PIR_{TRIP}$ | SEL1, SEL0 = 00 SEL1, SEL0 = 01 SEL1, SEL0 = 10 SEL1, SEL0 = 11 | | ±85 ±170 ±340 ±675 | | mV mV mV mV |
| IRD Sensor Gain | $IRD_G$ | | | 800 | | mV/uA |
| IRD Detector Bandwidth | $IRD_{BW}$ | | | 25 to 500 | | KHz |
| IRD Detector Rejection Ratio | $IRD_{RR}$ | Frequency = 60 Hz | | −70 | | dB |
| IRD Detector Hysteresis | $IRD_{HYS}$ | | | ±40 | | mV |
| Ambient Light Sensor Gain Settings | $AMBL_G$ | SEL1, SEL0 = 00 SEL1, SEL0 = 01 SEL1, SEL0 = 10 SEL1, SEL0 = 11 | | 10 30 100 300 | | mV/uA mV/uA mV/uA mV/uA |
| Ambient Light Sensor Bandwidth | $AMBL_{BW}$ | $C_{FX}$ = 10 uF (external) | | 0.32 | | Hz |
| Amb. Light Sensor Rejection Ratio | $AMBL_{BW}$ | $C_{FX}$ = 10 uF, Frequency = 60 Hz | | −40 | | dB |

Table 1B provides a list of the electrical parameters associated with the capacitance sensor, the analog-to-digital converter and instrumentation amplifiers, and the DALI and digital interface circuits.

TABLE 1B

TABLE 1B Electrical Characteristics (continued)
$V_{DD}$ = 3.3 V, Temperature = 25° C. (External components are designated with an "X" subscript.)

| Parameter/Circuit | Symbol | Conditions | Min | Typical | Max | Units |
|---|---|---|---|---|---|---|
| Capacitance Sensor (Relative Humidity) | | | | | | |
| Capacitance Meter Test Frequency | $CAPM_F$ | $C_{RHIX}$ = 80 pF | | 15 | | KHz |
| Capacitance Meter | $CAPM_{CNTL}$ | RHI = 0% ($C_{RHIX}$ = 80 pF) | | 512 | | clocks |
| Counter Output at Low Resolution | | RHI = 100% ($C_{RHIX}$ = 107 pF) | | 381 | | clocks |
| Capacitance Meter | $CAPM_{CNTH}$ | RHI = 0% ($C_{RHIX}$ = 80 pF) | | 2048 | | clocks |
| Counter Output at High Resolution | | RHI = 100% ($C_{RHIX}$ = 107 pF) | | 1526 | | clocks |
| Capacitance Meter Resolution | $CAPM_{RES}$ | Resolution = Low | | 0.8 | | % RHI |
| | | Resolution = High | | 0.2 | | % RHI |
| Capacitance Meter Cycle Time | $CAPM_{CT}$ | Resolution = Low | | 35 | | msec |
| | | Resolution = High | | 130 | | msec |
| ADC & Instrumentation Amplifier | | | | | | |
| High Voltage Input Attenuation | $HVIN_{ATN}$ | | | X0.1 | | |
| High Voltage Input Range | $HVIN_{RGN}$ | Pull-up enabled | | −30 to $V_{DD}$ | | V |
| | | Pull-down enabled | | 0 to +30 | | V |
| Input DAC Resolution | $IDAC_{RES}$ | | | 8 | | bits |
| Input DAC Output Range | $IDAC_{RES}$ | $V_{TOP}$ = $V_{DD}$ | | 0-$V_{DD}$ | | V |
| | | $V_{TOP}$ = $V_{REF}$ (+2.50 V) | | 0-2.50 | | V |
| Input DAC Output Linearity Error | $IDAC_{LIN}$ | Guaranteed monotonic | | <1 | | bit |
| Instrumentation Amp Gain | $IA_{AV}$ | SEL1, SEL0 = 00 | | 2.0 | | V/V |
| | | SEL1, SEL0 = 01 | | 8.0 | | V/V |
| | | SEL1, SEL0 = 10 | | 25.0 | | V/V |
| | | SEL1, SEL0 = 11 | | 100 | | V/V |
| Instrumentation Amp CMRR | $IA_{CMRR}$ | $V_{IN}$ = 1.25 V | | −40 | | dB |
| ADC Track & Hold Acquisition time | $ADC_{ACQ}$ | $V_{IN}$ step = 1.25 V | | 1 | | usec |
| ADC Track & Hold Droop | $ADC_{DRP}$ | $V_{HOLD}$ step = 1.25 V | | <1 | | mV/msec |
| ADC Resolution | $ADC_{RES}$ | $V_{REF}$ = 2.50 V | | 10 | | bits |
| | | | | 2.44 | | mV/bit |
| ADC Conversion Time | $ADC_{CONV}$ | ADC Clock Freq = 1 MHz | | 10 | | usec |
| ADC Conversion Accuracy | $ADC_{DLE}$ | $V_{IN}$ = 0.0 V to 2.50 V | | <1 | | bit |
| Differential Linearity Error | | Guaranteed monotonic | | | | |
| DALI & Digital Interface Circuits | | | | | | |
| DALI Output Control - Digital PWM Resolution | $DALI_{PWM}$ | Output data = 0 to 255 | | 8 | | bits |
| DALI Output Control—Analog DAC Resolution | $DALI_{DAC}$ | Output data = 0 to 255 | | 8 | | bits |
| | | Output range #1 | | 0 to 10 | | V |
| | | Output range #2 | | 1 to 10 | | V |
| Digital Interface - SPI Maximum clock frequency | $SPI_{CF}$ | | | 10 | | MHz |
| Digital Interface - I²C Maximum clock frequency | $I2C_{CF}$ | | | 10 | | MHz |
| Digital Interface - UART Maximum clock frequency | $UART_{CF}$ | | | 5 | | MHz |

Finally, TABLE 2 lists the pin configuration of the sensor system ASIC device. Several of the pins on the ASIC are programmable as input or output as necessary (e.g., SPI, GPIO).

TABLE 2 Pin Configuration

| # of Pins | Pin Name | Pin Type | Description |
|---|---|---|---|
| 1 | VDC_EXT | Power | External supply |
| 1 | VDC_POE | Power | Power over Ethernet |
| 1 | VDALI | Power | DALI Power & Data |
| 1 | VSUPPLY | Power | DALI power filter capacitor |
| 1 | VDD | Power | Digital power |
| 2 | VSS | Ground | System ground |
| 1 | VDD_BUCK | Regulator | Buck VDD output |
| 1 | BUCK_IND | Regulator | Buck regulator inductor |
| 4 | VREG1-4 | Regulators | Linear (LDO) regulator outputs (4) |
| 1 | VPOS_BOOST | Regulator | Boost regulator output |
| 1 | BOOST_CLK | Regulator | Charge pump clock (phase 1) |
| 1 | BOOST_CLKN | Regulator | Charge pump clock (phase 2) |
| 1 | RESET | Digital Input | External Reset/POR bypass |
| 2 | XTAL1 | Xtal Oscillator | Crystal oscillator #1 (In & out) |
| 2 | XTAL2 | Xtal Oscillator | Crystal oscillator #2 (In & out) |
| 1 | CLK_OUT | Clock Output | Reference clock output |
| 1 | CLK_SEL | Digital Input | Clock select (XTAL1 or TEST-CLK) |
| 4 | SPI | Digital I/O | SPI interface pins (CS, Clock, Data In, Data Out) |
| 2 | I²C | Digital I/O | I²C interface pins (Clock & Data I/O) |
| 2 | UART | Digital I/O | Universal Transmit & Receive |
| 8 | uC GPIO | Digital I/O | 8 General Purpose Digital I/O |
| 5 | uC GPIO | Digital I/O | 5 Digital I/O for external Flash |
| 1 | DALI_PWM | HV Digital Out | DALI PWM control signal |

TABLE 2-continued

TABLE 2 Pin Configuration

| # of Pins | Pin Name | Pin Type | Description |
| --- | --- | --- | --- |
| 1 | RBIAS | Analog | External RBIAS resistor |
| 1 | VREF | Analog | +2.5 V Reference Voltage Output |
| 2 | PIR 1 Hz Filter | Analog | External RC for Motion sensor filter |
| 1 | IRD 60 Hz Filter | Analog | External C for Ambient light sensor filter |
| 6 | Photo Sensors | Analog | IR Sensors (Motion sensor, IRD & Ambient light) |
| 2 | RHI Sensors | Analog | Relative humidity sensors |
| 12 | V Sensors | Analog | General purpose voltage sensors (to ADC) |
| 1 | A_TEST | Analog | Analog test port |
| 1 | DALI_DAC | Analog | DALI Analog control voltage (0-10 V |

Another aspect of the invention is a miniature multi-function sensor for installation in light fixtures. A purpose-built integrated circuit has been developed that contains and shrinks the electronics required to sense temperature, humidity, barometric pressure, occupation and motion all from within a light fixture. Existing sensors are so large that they disrupt the integrity of the fixture and building design. Existing sensors attempt to estimate the temperature of the space by measuring the core temperature of the microprocessor inside the sensor that is itself inside a fixture and applying an adjustment factor. Such sensors also use multiple off-the-shelf components to create assemblies that can monitor the building and its occupants. The use of components like these increase the cost, complexity, assembly difficulty, size and cost of existing systems while making them less robust.

Figure 7:
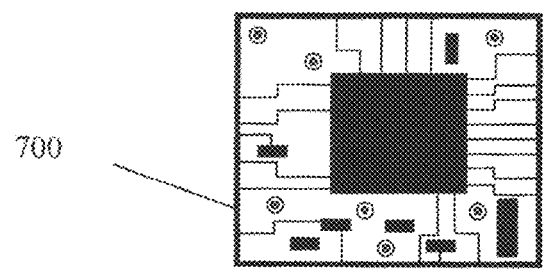
FIG. 7 is a plan view representation of the miniature circuit board of the light fixture sensor device.
Figure 9:
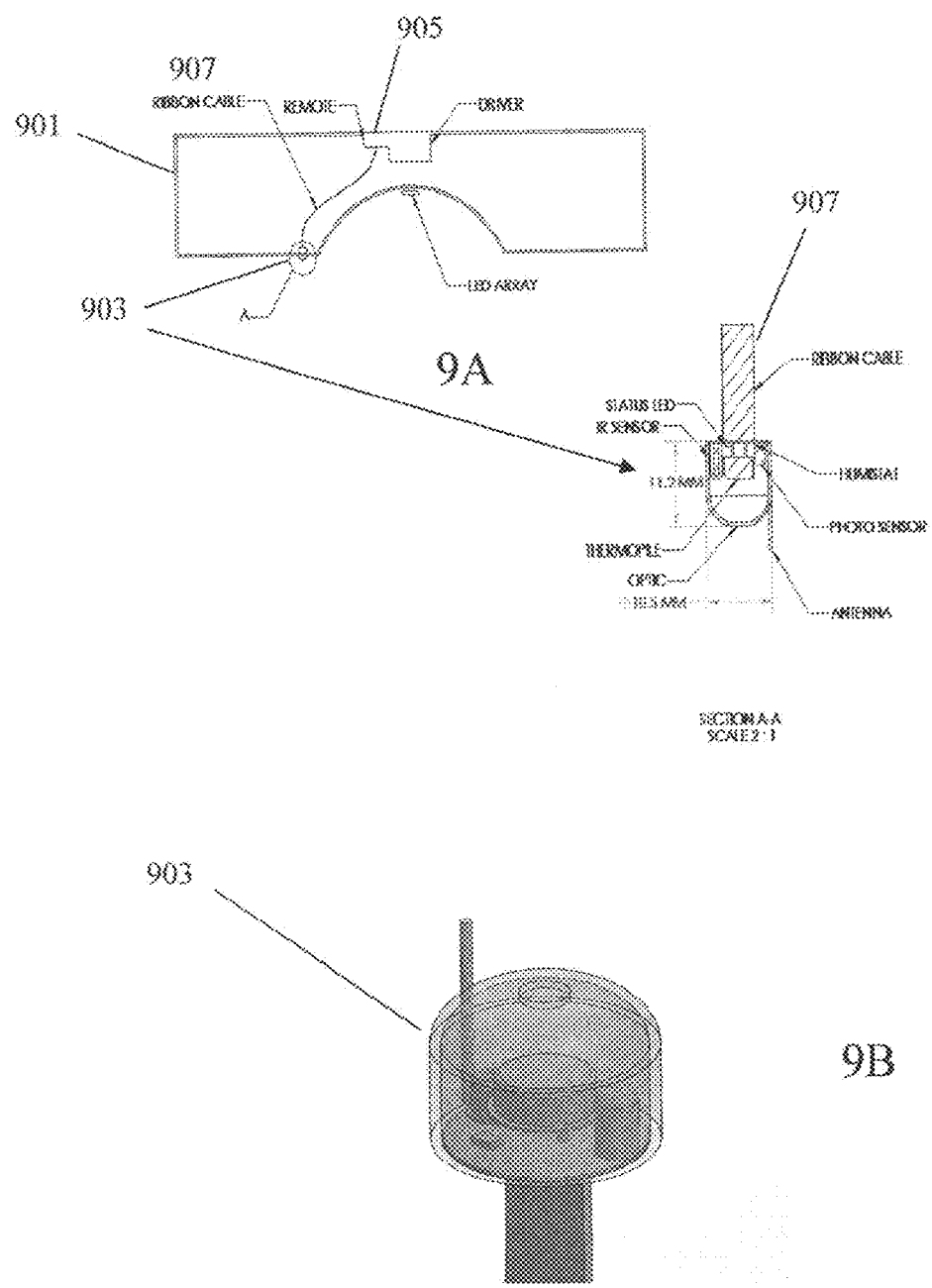
FIG. 9A is a schematic view of the miniature light fixture sensor device.
FIG. 9B is a three-dimensional grayscale drawing of the light fixture sensor device.

Instead, in this aspect of the present invention, the electronics associated with the miniature multi-function sensor may be contained within the light fixture. As shown in FIG. 7, a single compact circuit board contains the integrated circuit 700 a crystal, transceiver, memory, driver output controls and necessary discrete components. The tiny circuit board is connected by two ribbon cables, one six-conductor and one three-conductor. A three-position bulkhead connector connects to a driver. (See FIG. 9) The device draws power from the driver, power-over-ethernet (POE) or the supply. The ASIC manages the different power requirements of the various sensors, the processor, and the transceivers/comms devices. The combined device is less than one square inch in size.

Figure 8:
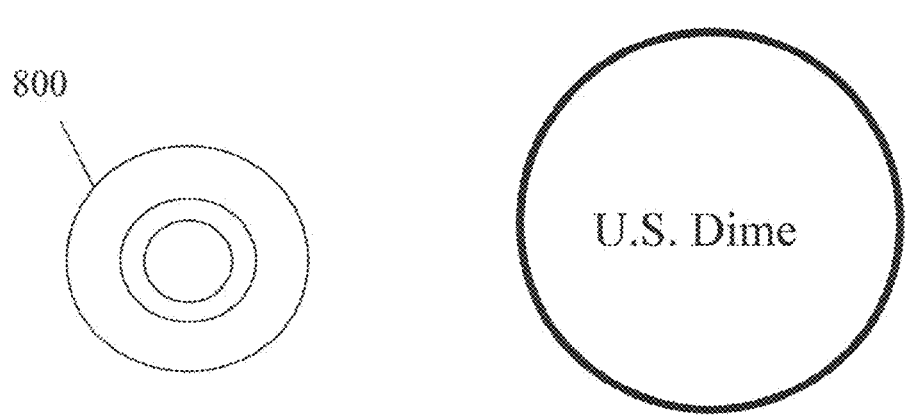
FIG. 8 is an actual size top plan view of the miniature light fixture sensor device compared to a proportional representation of a U.S. dime.

Referring to FIG. 8, the multi-sensor array 800 is a tiny button, smaller than a U.S. dime. This device contains a thermopile, thermistor, humidity sensor, barometer, photo-sensor, optical sensor, infrared sensor, a status LED and an antenna that transmits the sensor outputs. FIG. 9A illustrates the placement of the multi-sensor device 903 in a light fixture 901. The multi-sensor 903 is attached by a ribbon cable 907 to a remote bulkhead connector 905 that connects to a driver in the fixture. The ribbon cable 907 connects into the underside of the multi-sensor device and into the circuit board 700. As shown in FIG. 9A, the multi-sensor device may contain a miniature IR sensor, a humistat, barometer, a thermopile, a photosensor, an optical sensor and an RF antenna. The illustration in FIG. 9B shows the internal configuration of the sensor elements in three dimensions.

Multicellular thermopile sensors or CMOS sensors can be used to create an image of a few pixels that may converted and processed in the CPU of the ASIC to enable people counting in the space monitored by the multi-sensor device.

The system may include dual thermopile sensors to monitor $CO_2$ levels. One may be equipped with a narrow bandpass filter allowing only narrow portions of the infrared spectrum while the other admits a broader IR spectrum. The ASIC may then take in and process the analog signals from the sensors and measure the relative concentration of returns from the portion of the spectrum reflected by $CO_2$.

We claim:

1. A building management system comprising an integrated circuit device that provides at least facility lighting control, security monitoring and alerts, and environmental monitoring and control, by receiving and processing sensor signals and generating control output signals to building systems using data encryption modalities including one or more of public/private key encryption or a blockchain database; said system further comprising environmental sensors and a communication transceiver;
   wherein the integrated circuit device receives sensor inputs from one or more integrated sensor arrays, each sensor array being contained in a single miniature structure and wherein each of the one or more arrays is located in an individual light fixture;
   wherein said integrated circuit device further comprises colorimetry determination using combinations of multiple photosensors to determine light intensity level and correlated color temperature of the ambient light;
   wherein said integrated circuit device further comprises integration of the sensing of current, voltage and phase angle to determine power consumption;
   wherein said output control signals include outputs to manage Variable Air Volume (VAV) HVAC system dampers;
   wherein said integrated circuit device reacts to externally generated RF signals from wireless sensor systems including but not limited to $NO_2$, CO, CFCs, $CO_2$, oxygen, methane, smoke and fire and determines an appropriate response;
   wherein said integrated circuit device further comprises integrated humidity detection and measurement and determination; and
   wherein said integrated circuit device determines intruder path projection and likely egress to assist security personnel in making an apprehension of said intruder.

2. The building management system of claim 1, wherein said integrated circuit device comprises a security function that determines a count of intruders based an occupancy sensor detection pattern.

3. The building management system of claim 2, wherein said integrated circuit device further comprises pins which are programmable as inputs or output.

4. The building management system of claim 3, wherein said integrated circuit device further comprises memory circuits appurtenant to the said at least one microprocessor wherein computed building status is communicated to building systems with the transceiver.

5. The building management system of claim 4, wherein said integrated circuit device can interoperate with Zigbee, Z-Wave, WiFi, 4G LTE, Bluetooth, and LTE Cat 0 radio protocols.

* * * * *